US009106648B2

(12) United States Patent
Zhou et al.

(10) Patent No.: US 9,106,648 B2
(45) Date of Patent: Aug. 11, 2015

(54) METHOD AND APPARATUS FOR DATA TRANSMISSION

(71) Applicant: Huawei Technologies Co., LTD, Shenzhen (CN)

(72) Inventors: Xueyi Zhou, Hangzhou (CN); Jun Yang, Hangzhou (CN); Kai Zhang, Hangzhou (CN); Hongtao Cao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/138,027

(22) Filed: Dec. 21, 2013

(65) Prior Publication Data
US 2014/0109213 A1      Apr. 17, 2014

Related U.S. Application Data

(63) Continuation of application No. PCT/CN2012/076164, filed on May 28, 2012.

(30) Foreign Application Priority Data

Jul. 5, 2011   (CN) .......................... 2011 1 0187072

(51) Int. Cl.
*H04L 29/06* (2006.01)
*H04L 9/32* (2006.01)

(52) U.S. Cl.
CPC ............ *H04L 63/0876* (2013.01); *H04L 9/321* (2013.01); *H04L 9/3236* (2013.01); *H04L 63/0428* (2013.01); *H04L 65/1006* (2013.01); *H04L 65/1069* (2013.01)

(58) Field of Classification Search
CPC . H04L 63/0876; H04L 63/0428; H04L 63/08; H04L 65/1069; H04L 65/1006; H04L 9/321

USPC ................................................... 726/1–7, 12
See application file for complete search history.

(56) References Cited

U.S. PATENT DOCUMENTS

| 6,751,677 | B1 * | 6/2004 | Ilnicki et al. ................... 719/316 |
| 7,240,366 | B2 * | 7/2007 | Buch et al. ....................... 726/14 |

(Continued)

FOREIGN PATENT DOCUMENTS

| CN | 1682505 A | 10/2005 |
| CN | 1889562 A | 1/2007 |

(Continued)

OTHER PUBLICATIONS

Schulzrinne et al., Memo "RTP: A Transport Protocol for Real-Time Applications", Standard Track, RFC 3550, RTP, Jul. 2003, 93 pages.

(Continued)

*Primary Examiner* — Catherine Thiaw
(74) *Attorney, Agent, or Firm* — Slater & Matsil, L.L.P.

(57) ABSTRACT

Embodiments of the present invention relate to communications technologies and disclose a method and a system for establishing a data transmission channel, a SIP server, and a session border controller. A first authentication request message is sent by a first terminal. The first authentication request message includes identifier information of the first terminal and identity information of a second terminal. It is determined that the identifier information of the first terminal matches pre-stored authentication information of the first terminal. According to the identity information of the second terminal, a second authentication request message that carries authentication information of the second terminal is sent to the second terminal. After receiving an authentication success response message from the second terminal, a data transmission channel is established between the first terminal and the second terminal.

14 Claims, 8 Drawing Sheets

(56) References Cited

U.S. PATENT DOCUMENTS

| | | | |
|---|---|---|---|
| 7,243,370 B2 | 7/2007 | Bobde et al. | |
| 7,697,692 B2 * | 4/2010 | Takata et al. | 380/277 |
| 8,180,054 B2 * | 5/2012 | Sakamoto | 380/258 |
| 8,583,912 B2 * | 11/2013 | Ishikawa et al. | 713/151 |
| 8,825,738 B2 * | 9/2014 | Naono et al. | 709/203 |
| 2002/0035681 A1 * | 3/2002 | Maturana et al. | 713/151 |
| 2003/0135865 A1 | 7/2003 | Jung | |
| 2004/0008666 A1 | 1/2004 | Hardjono | |
| 2007/0004393 A1 * | 1/2007 | Forsberg et al. | 455/420 |
| 2007/0237319 A1 * | 10/2007 | Brown et al. | 379/142.05 |
| 2009/0016339 A1 * | 1/2009 | Tanizawa et al. | 370/389 |
| 2009/0044258 A1 * | 2/2009 | Zhong et al. | 726/4 |
| 2009/0113063 A1 | 4/2009 | Yeh | |
| 2009/0287921 A1 * | 11/2009 | Zhu et al. | 713/155 |
| 2009/0287922 A1 * | 11/2009 | Herwono et al. | 713/155 |
| 2010/0251331 A1 * | 9/2010 | Li | 726/3 |
| 2011/0185073 A1 * | 7/2011 | Jagadeeswaran et al. | 709/228 |
| 2011/0231651 A1 * | 9/2011 | Bollay | 713/152 |
| 2011/0258432 A1 * | 10/2011 | Rao et al. | 713/150 |
| 2011/0264914 A1 * | 10/2011 | Bae et al. | 713/170 |
| 2011/0265166 A1 * | 10/2011 | Franco et al. | 726/7 |
| 2012/0204032 A1 * | 8/2012 | Wilkins et al. | 713/170 |
| 2013/0086649 A1 * | 4/2013 | Battistello | 726/4 |
| 2013/0212646 A1 * | 8/2013 | McFarland et al. | 726/4 |
| 2013/0262858 A1 * | 10/2013 | Neuman et al. | 713/155 |

FOREIGN PATENT DOCUMENTS

| | | |
|---|---|---|
| CN | 101197674 A | 6/2008 |
| CN | 101771535 A | 7/2010 |
| CN | 102035718 A | 4/2011 |
| CN | 102111404 A | 6/2011 |

OTHER PUBLICATIONS

3GPP, "3rd Generation Partnership Project; Technical Specification Group Services and System Aspects; 3G security; Access security for IP-based services," 3GPP TS 33.203, Version 11.0.0, Release 11, Dec. 2010, 114 pages.

\* cited by examiner

METHOD AND APPARATUS FOR DATA TRANSMISSION

This application is a continuation of International Application No. PCT/CN2012/076164, filed on May 28, 2012, which claims priority to Chinese Patent Application No. 201110187072.8, filed on Jul. 5, 2011, both of which are hereby incorporated by reference in their entireties.

TECHNICAL FIELD

The present invention relates to the field of communications technologies, and in particular, to a method and an apparatus for data transmission.

BACKGROUND

With continuous development of network technologies, transmitting all types of data by using network technologies has become an indispensable part of people's life and work.

With continuous development of a VoIP (Voice over Internet Protocol, for digitizing analog voice signals) technology, RTP (Real-time Transport Protocol) is widely applied in the transmission of media data over a broadband network. Meanwhile, security problems of a data channel during the data transmission gradually attract attention of people. However, there are some security loopholes in the conventional VoIP networking, and enterprises have a possibility of leaking confidential information.

During the data transmission between terminal A and terminal B, signaling negotiation processes initiated by terminal A and terminal B are standard processes. In these standard processes, formats and content of each piece of signaling transmitted between the terminals and a Session Initiation Protocol (SIP) server are all known by those skilled in the art. Therefore, the foregoing signaling negotiation processes, including registration negotiation, call negotiation, and the like, are easily constructed by using conventional software technologies, for example, signaling negotiation can also be implemented successfully under the SIP server by using illegal software, so that an illegal data channel is established to transmit illegal data through the SIP server.

SUMMARY OF THE INVENTION

Embodiments of the present invention provide a method and an apparatus for data transmission to enhance security of data transmission.

One aspect of the present invention provides a method for establishing a data transmission channel. A request message is sent by a first terminal. The first authentication request message includes identifier information of the first terminal and identity information of a second terminal. The identifier information of the first terminal matches pre-stored authentication information of the first terminal. Stored authentication information of the second terminal is obtained according to the identity information of the second terminal. According to the identity information of the second terminal, a second authentication request message that carries the authentication information of the second terminal a sends to the second terminal, so that the second terminal confirms that the authentication information of the second terminal in the second authentication request message matches the identifier information of the second terminal and returns an authentication success response message. After receiving the authentication success response message returned by the second terminal, a data transmission channel is established between the first terminal and the second terminal.

Another aspect of the present invention provides a method for data transmission. A data transmission request message is sent by a communication requesting end. The data transmission request message includes an encrypted payload and identity information of a communication peer end. A first payload is decrypted from the encrypted payload according to a stored authentication code of the communication requesting end and a preset decryption algorithm. The first payload is forward to the communication peer end according to the identity information of the communication peer end.

Still another aspect of the present invention provides a method for data transmission. A data transmission request message is sent by a communication requesting end. The data transmission request message includes a first payload and identity information of a communication peer end. It is determined whether the data transmission request message includes a first check field. The first check field is calculated by the communication requesting end according to the first payload and a check code of the communication requesting end and by using a preset check algorithm. If the data transmission request message includes the first check field, it is determined that the first check field is calculated by using the first payload and the check code of the communication requesting end and by using the preset check algorithm. The first payload is forwarded to the communication peer end.

Still another aspect of the present invention provides a SIP server. A first receiving unit is configured to receive a first authentication request message sent by a first terminal. The first authentication request message includes identifier information of the first terminal and identity information of a second terminal. A first determining unit is configured to determine that the identifier information of the first terminal matches pre-stored authentication information of the first terminal. A first sending unit is configured to obtain stored authentication information of the second terminal according to the identity information of the second terminal and send, according to the identity information of the second terminal, a second authentication request message that carries the authentication information of the second terminal to the second terminal, so that the second terminal confirms that the authentication information of the second terminal in the second authentication request message matches the identifier information of the second terminal and returns an authentication success response message. An establishing unit is configured to establish a data transmission channel between the first terminal and the second terminal after the authentication success response message returned by the second terminal is received.

Still another aspect of the present invention provides a session border controller. A receiving unit is configured to receive a data transmission request message sent by a communication requesting end. The data transmission request message includes an encrypted payload and identity information of a communication peer end. A decrypting unit is configured to decrypt a first payload from the encrypted payload according to a stored authentication code of the communication requesting end and a preset decryption algorithm. A forwarding unit is configured to forward the first payload to the communication peer end according to the identity information of the communication peer end.

Still another aspect of the present invention provides a session border controller. A receiving unit is configured to receive a data transmission request message sent by a communication requesting end. The data transmission request message includes a first payload and identifier information of a communication peer end. A judging unit is configured to judge whether the data transmission request message includes a first check field. The first check field is calculated by the communication requesting end according to the first payload and a check code of the communication requesting end and by using a preset check algorithm. A determining unit is configured to determine, if the data transmission request message includes the first check field, that the first check field is calculated by using the first payload and the check code of the communication requesting end and by using the preset check algorithm. A second forwarding unit is configured to forward the first payload to the communication peer end.

Still another aspect of the present invention provides a system for data transmission, including the foregoing SIP server and the foregoing session border controller.

Still another aspect of the present invention provides a method for data transmission, including the foregoing method for establishing a data transmission channel and the foregoing method for data transmission.

According to the method for establishing a data transmission channel, the SIP server, the session border controller, and the method and system for data transmission that are provided in embodiments of the present invention, because the SIP server pre-stores authentication information used to authenticate terminals, the SIP server verifies legality of the terminals that perform data transmission before the SIP server establishes a data transmission channel between the terminals. The SIP server establishes a data transmission channel between a communication requesting end and a communication peer end only when determining that the communication requesting end is a legal terminal, thereby reducing a risk of establishing a data transmission channel through illegal negotiation between an illegal terminal and the SIP server.

With respect to the system for data transmission that includes a session border controller SBC, the SBC decrypts an encrypted payload according to a preset decryption algorithm to obtain a first payload, and forwards the decrypted first payload to the communication peer end. Only a payload sent by a legal communication requesting end can be correctly forwarded to a communication peer end; for a data transmission request of an illegal communication requesting end, because the communication requesting end cannot know a preset encryption algorithm in advance, the illegal communication requesting end cannot encrypt the payload correctly. After the payload of the illegal communication requesting end is decrypted by the SBC, the decrypted payload is definitely not the payload that the communication requesting end wants to transmit to the communication peer end, but is usually some garbled characters. Therefore, a risk of simulating a data channel to perform illegal data transmission by an illegal communication requesting end can be effectively reduced.

Alternatively, before forwarding the first payload of the communication requesting end to the communication peer end, the SBC needs to judge whether the data transmission request of the communication requesting end includes a first check field used to authenticate the communication requesting end; the SBC forwards the first payload of the communication requesting end to the communication peer end only when the data transmission request of the communication requesting end includes the first check field and the first check field is correct. Therefore, a risk of simulating a data channel to perform illegal data transmission by an illegal communication requesting end can be effectively reduced.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Figure 1:
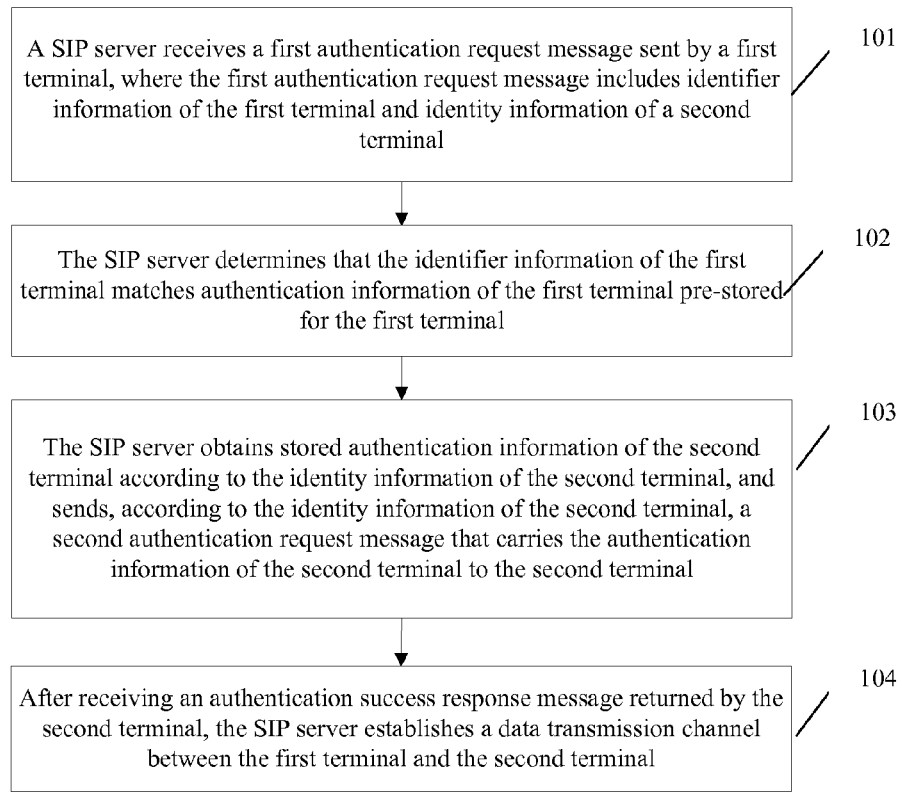
FIG. 1 is a flowchart of a method for establishing a data transmission channel according to an embodiment of the present invention.

An embodiment of the present invention provides a method for establishing a data transmission channel. As shown in FIG. 1, the method includes the following steps.

101. A SIP server receives a first authentication request message sent by a first terminal, where the first authentication request message includes identifier information of the first terminal and identity information of a second terminal.

Before performing data transmission with the second terminal, the first terminal firstly sends a first authentication request message to the SIP server, requesting the SIP server to verify legality of the first terminal. To provide the SIP server with an authentication basis, the first authentication request message includes the identifier information of the first terminal.

The identifier information of the first terminal may be an international mobile subscriber identity (IMSI), or be only a serial number (SNR) of the terminal, or be other identifiers of the terminal. In addition, the identifier information of the first terminal is encapsulated by using a function agreed between the first terminal and the server or other existing functions, which is not specifically limited by the present invention. The identity information of the second terminal may be generally routing information of the second terminal, for example, the number of the second terminal and the like.

With respect to the first terminal and the second terminal, the first terminal and the second terminal provided in this embodiment of the present invention may be a mobile phone, a PC (personal computer), a portable computer, and the like.

102. The SIP server determines that the identifier information of the first terminal matches pre-stored authentication information of the first terminal.

After receiving the authentication request message from the first terminal, the SIP server obtains the identifier information of the first terminal from the first authentication request message, and authenticates the first terminal by using the identifier information of the first terminal.

With respect to the authentication information of the first terminal, the SIP server pre-stores authentication information of identifier information of all terminals served by the SIP server, where the authentication information and the identifier information of the terminals meet a preset mapping relationship. In this embodiment, the authentication information of the first terminal is the authentication information of the first terminal. The identifier information of the first terminal is the identifier information of the first terminal.

The preset mapping relationship between the authentication information and the identifier information of the terminals may be set according to needs, for example, the authentication information and the identifier information may be set to be the same, that is, in this embodiment, the authentication information of the first terminal is set to be the same as the identifier information of the first terminal. To further enhance the security of the data transmission channel, the authentication information and the identifier information may be made to meet a preset function relationship, that is, the authentication information may be the identifier information plus 1 or be the power of the identifier information. In this embodiment, the authentication information of the first terminal is set to the identifier information plus 1, and may also be set to the power of the identifier information. The preset relationship between the authentication information and the identifier information of the terminals may be any other mapping relationship known by those skilled in the art, and is not further described herein.

103. The SIP server obtains stored authentication information of the second terminal according to the identity information of the second terminal, and sends, according to the identity information of the second terminal, a second authentication request message that carries the authentication information of the second terminal to the second terminal, so that the second terminal confirms that the authentication information of the second terminal in the second authentication request message matches the identifier information of the second terminal and returns an authentication success response message.

If the identifier information of the first terminal matches the pre-stored authentication information of the first terminal, it indicates that the first terminal is legal and can perform data communication through the SIP server. Then, the SIP server sends a second authentication request message to the second terminal, and the second terminal is a communication peer end of the data transmission channel that the first terminal requests to establish.

104. After receiving the authentication success response message returned by the second terminal, the SIP server establishes a data transmission channel between the first terminal and the second terminal.

After receiving the second authentication request message sent by the SIP server, the second terminal obtains the authentication information of the second terminal from the second authentication request message, and matches the obtained authentication information of the second terminal with the identifier information of the second terminal; if the matching succeeds, the second terminal sends an authentication success response message to the SIP server; if the matching fails, the second terminal refuses to establish a data transmission channel with the first terminal.

According to the method for establishing a data transmission channel provided in this embodiment of the present invention, a SIP server receives a first authentication request message sent by a first terminal, where the first authentication request message includes identifier information of the first terminal; the SIP server verifies legality of the first terminal, that is, the SIP server determines that pre-stored authentication information of the first terminal matches the identifier information of the first terminal; if the authentication information of the first terminal matches the identifier information of the first terminal, the SIP server can confirm that the first terminal is a legal user, and establish a data transmission channel between the first terminal and a second terminal.

Because the SIP server pre-stores authentication information used to authenticate terminals, the SIP server verifies legality of the terminals that perform data transmission before the SIP server establishes a data transmission channel between the terminals; the SIP server establishes a data transmission channel between a communication requesting end and a communication peer end only when determining that the communication requesting end is a legal terminal, thereby reducing a risk of establishing a data transmission channel through illegal negotiation between an illegal terminal and the SIP server.

Figure 2A:
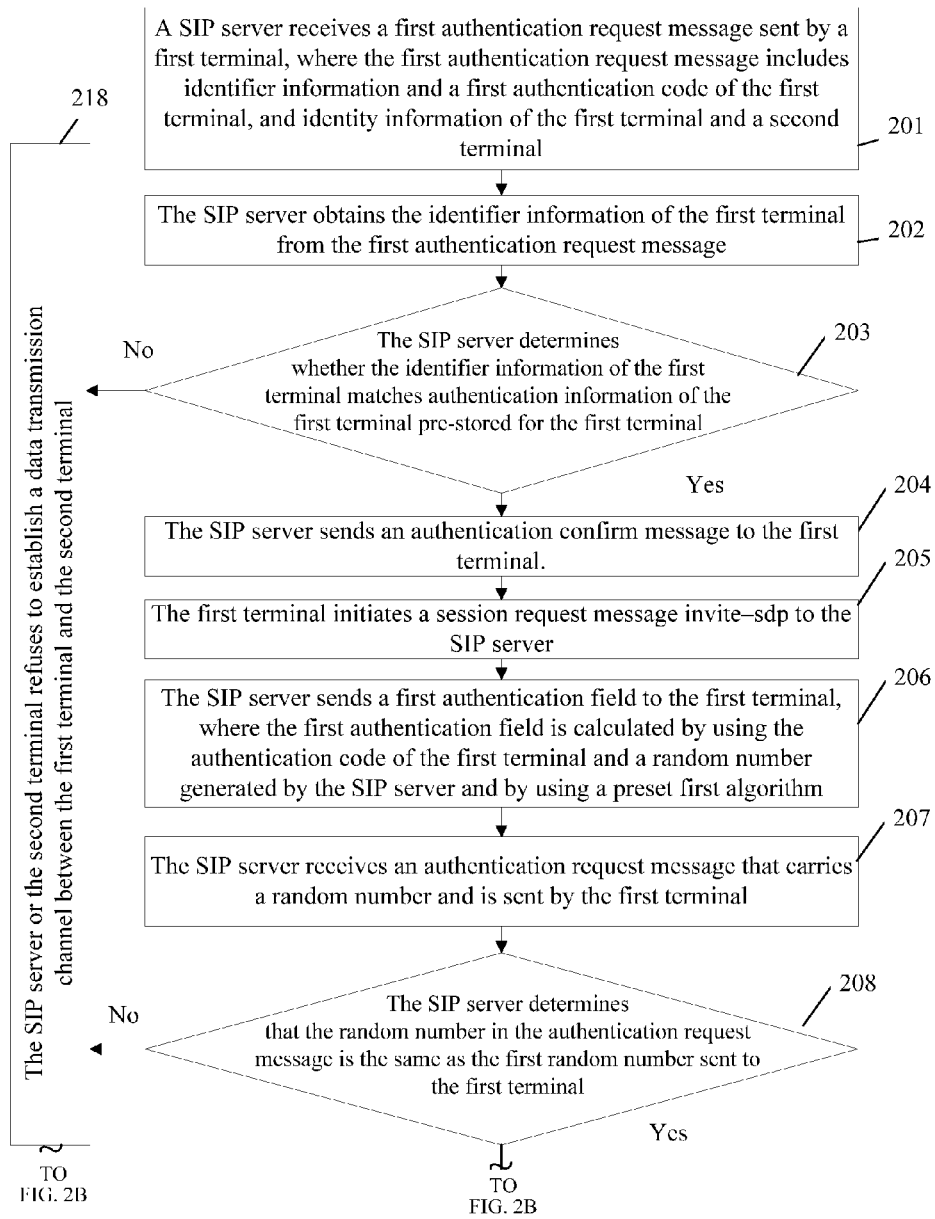
FIG. 2A, FIG. 2B, and FIG. 2C are a flowchart of another method for establishing a data transmission channel according to an embodiment of the present invention.
Figure 2B:
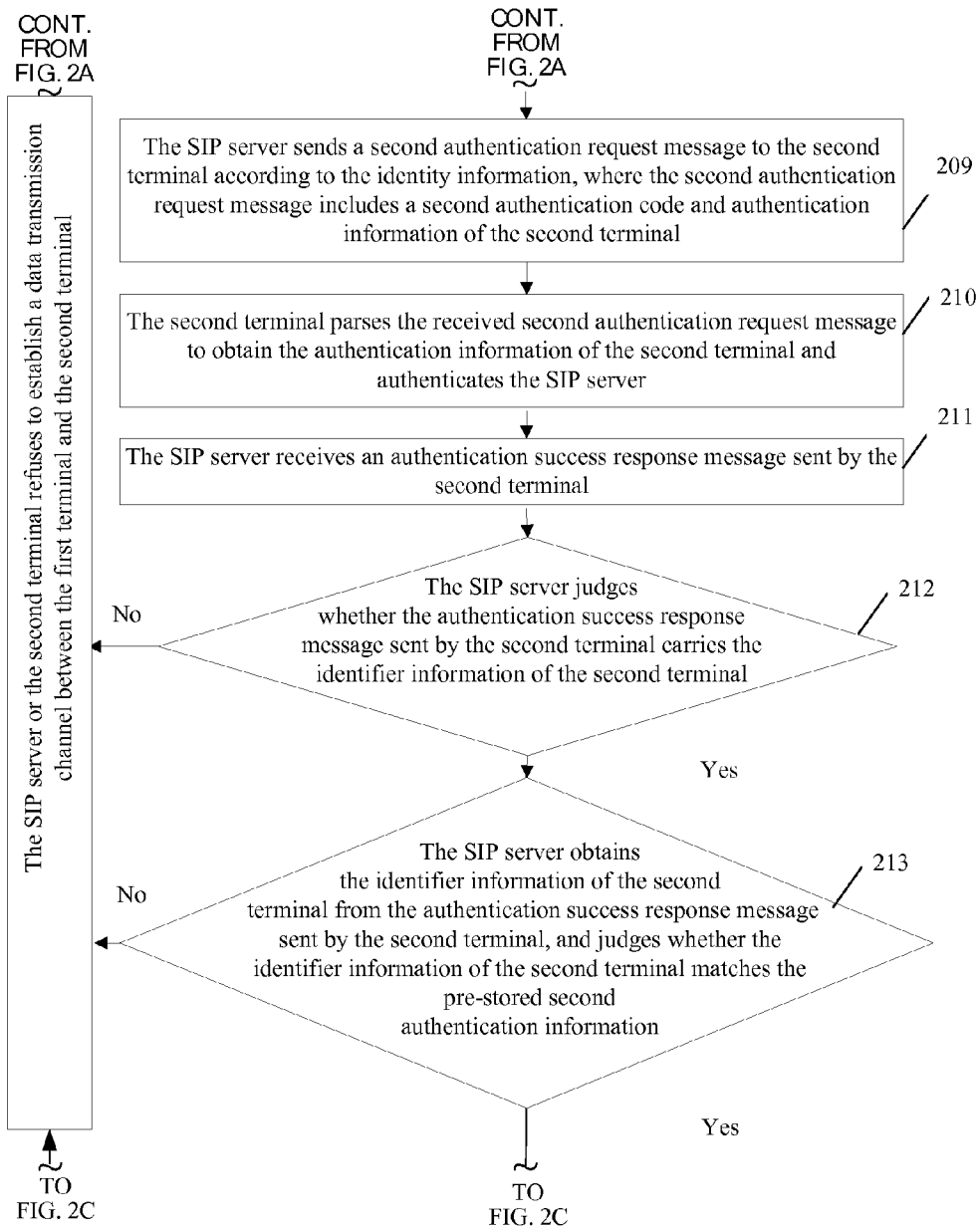
Figure 2C:
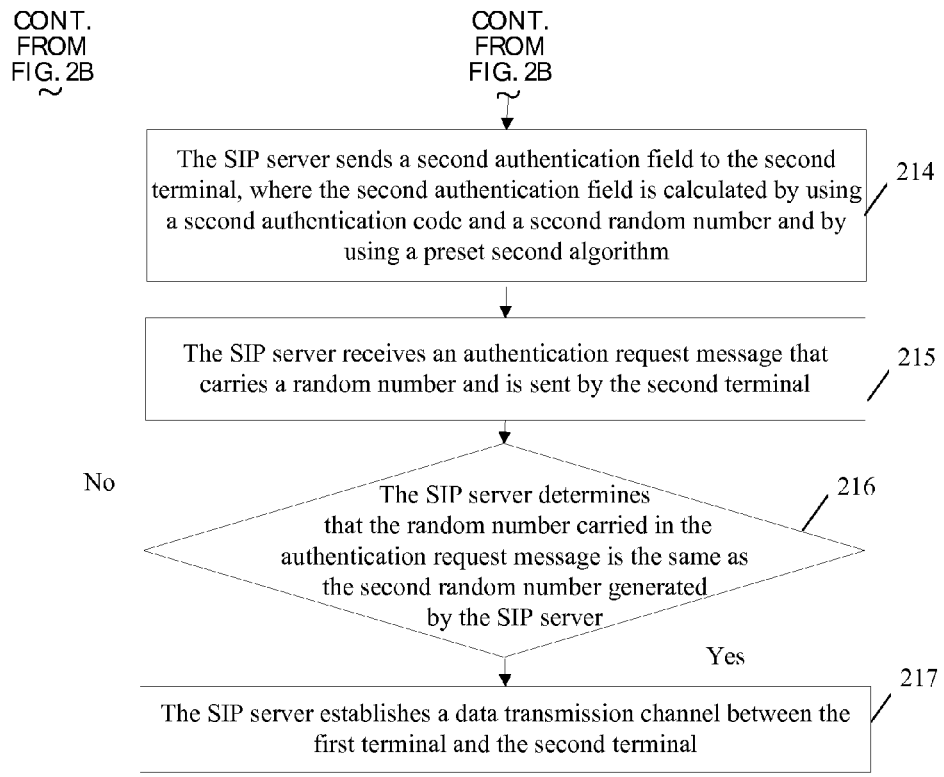

As an improvement of this embodiment, an embodiment of the present invention provides another method for establishing a data transmission channel. As shown in FIG. 2A, FIG. 2B, and FIG. 2C, the method includes the following steps:

201. A SIP server receives a first authentication request message sent by a first terminal, where the first authentication request message includes identifier information and a first authentication code of the first terminal, and identity information of the first terminal and a second terminal.

The first authentication code is generated by the first terminal at random, and is encapsulated together with the identifier information of the first terminal by using a first algorithm agreed between the first terminal and the server, for example, an MD5 algorithm or other existing algorithms, which is not specifically limited by the present invention.

To further verify legality of terminals, authentication needs to be further performed on the terminals. For example, the first authentication code M is used in a process of authenticating the terminals and is generated at random by the first terminal initiating a request when the terminal initiates establishment of a data transmission channel to the SIP server.

In this embodiment, the identifier information and first authentication code of the first terminal carried in the first authentication request message are encapsulated by using an existing function negotiated with the SIP server, for example, Z1(SN1, M1), where SN1 refers to the serial number of the first terminal and M1 refers to the first authentication code. After receiving the first authentication request message, the SIP server stores the identity information of the first terminal, for example, the number of the first terminal, the authentication code of the first terminal, and the identity information of the second terminal, for example, the number of the second terminal.

Further, alternatively, the first terminal and the second terminal in this embodiment of the present invention may be located in the same network area, and may also be located in different network areas.

202. The SIP server obtains the identifier information of the first terminal from the first authentication request message.

To authenticate the first terminal, after receiving the authentication request message from the first terminal, the SIP server obtains the identifier information of the first terminal from the first authentication request message.

In this embodiment, the SIP server parses the first authentication request message to obtain Z1 (SN1, M1) carried in the first authentication request message, and further parses Z1 (SN1, M1) to obtain the identifier information SN1 of the first terminal of the first terminal.

203. The SIP server determines whether the identifier information of the first terminal matches the authentication information of the first terminal pre-stored for the first terminal.

The SIP server pre-stores a mapping relationship between authentication information of identifier information of all terminals served by the SIP server and the identity information of all the terminals, for example, numbers of the terminals, where the authentication information and the identifier information of the terminals meet a preset mapping relationship, the preset mapping relationship between the authentication information and the identifier information of the terminals may be set according to needs, for example, the authentication information may be set to be the same as the identifier information, that is, in this embodiment, the authentication information of the first terminal is set to be the same as the identifier information of the first terminal. To further enhance the security of the data transmission channel, the authentication information and the identifier information may be made to meet a preset function relationship, that is, the authentication information may be the identifier information plus 1 or be the power of the identifier information. In this embodiment, the authentication information of the first terminal is set to the identifier information of the first terminal plus 1, and may also be set to the power of the identifier information of the first terminal. The preset relationship between the authentication information and the identifier information of the terminals may be any other mapping relationship known by those skilled in the art, and is not further described herein.

This embodiment is based on an assumption that the authentication information of each terminal pre-stored in the SIP server is the same as the identifier information of each terminal. That is, the authentication information of the first terminal is the authentication information of the first terminal. The SIP server compares the identifier information SN1 of the first terminal with the authentication information of the first terminal; the SIP server obtains the authentication information of the first terminal according to the identity information of the first terminal, and further judges whether the identifier information of the first terminal is the same as the authentication information of the first terminal; if yes, step 204 is performed; if no, step 218 is performed.

204. The SIP server sends an authentication confirm message to the first terminal.

After the first terminal passes the authentication of the SIP server, the SIP server sends an authentication confirm message to the first terminal.

205. The first terminal initiates a session request message invite-sdp to the SIP server.

206. The SIP server sends a first authentication field to the first terminal, where the first authentication field is calculated by using the first authentication code and a first random number generated by the SIP server and by using a preset first algorithm, so that the first terminal obtains a first random number in the first authentication field by using a stored first authentication code and the preset first algorithm and carries the obtained first random number in an authentication request message sent to the SIP server.

To further verify legality of the first terminal, the SIP server instructs the first terminal to initiate an authentication process, and meanwhile the SIP server sends a first authentication field to the first terminal.

The first authentication field is calculated by using the first authentication code and the first random number generated by the SIP server and by using the preset first algorithm. For example, a nonce value may be calculated by using the MD5 algorithm according to the first authentication code and the first random number generated by the SIP server. Other algorithms for calculating the nonce value, which are known by those skilled in the art, are also applicable to this embodiment of the present invention, and are not further described herein.

In this embodiment, the SIP server carries the first authentication field in the authentication request message, with a header field proxy-Authenticate carrying a nonce value, where the nonce value is calculated by using the MD5 algorithm and the random number generated by the server and is generated by encrypting M1.

The first authentication code is sent by the first terminal to the SIP server during the authentication. Therefore, only the first terminal and the SIP server are capable of learning the first authentication code, and an illegal client cannot obtain the first authentication code.

207. The SIP server receives an authentication request message sent by the first terminal, where the authentication request message carries the first random number obtained by the first terminal from the first authentication field.

After receiving the first authentication field from the SIP server, the first terminal obtains, by using M1 stored locally and the preset first algorithm MD5 algorithm, the first random number generated by the SIP server, uses the obtained first random number as the first authentication information response value, and carries the first authentication information in an authentication request message sent to the SIP server.

The first terminal re-initiates a session Invite request and an additional Proxy-Authorization authentication request message, and carries the response value in the authentication request message, where the response value serves as a basis for the SIP server to judge legality of the first terminal. For details about other manners and methods for calculating the response value, reference may be made to other algorithms known by those skilled in the art, which is not further described herein.

208. The SIP server determines whether the first random number obtained by the first terminal from the first authentication field and carried in the authentication request message is the same as the first random number generated by the SIP server.

For terminals served by the SIP server, if the SIP server determines that the first random number obtained by the first terminal from the first authentication field and carried in the authentication request message is the same as the first random number generated by the SIP server, step 209 is performed. Otherwise, step 218 is performed.

209. The SIP server sends a second authentication request message to the second terminal according to the identity information, where the second authentication request message includes a second authentication code generated by the SIP server at random and authentication information of the second terminal preset for the second terminal.

If the identifier information of the first terminal matches the pre-stored authentication information of the first terminal, it indicates that the first terminal is legal, and the first terminal can perform data communication with the second terminal through the SIP server. Then, the SIP server confirms an address of the second terminal according to the identity information, and sends a second authentication request message to the second terminal according to the address, and the second terminal is the communication peer end of a data transmission channel that the first terminal requests to establish.

The second authentication request message may include pre-stored authentication information of the second terminal, and the authentication information of the second terminal and the identifier information of the second terminal of the second terminal meet a preset mapping relationship. The preset mapping relationship between the authentication information of the terminals and the identifier information of the terminals may be set according to needs, for example, the authentication information may be set to be the same as the identifier information, that is, in this embodiment, the authentication information of the second terminal is set to be the same as the identifier information of the second terminal. To further enhance the security of the data transmission channel, the authentication information and the identifier information may be made to meet a preset function relationship, that is, the authentication information may be the identifier information plus 1 or be the power of the identifier information. In this embodiment, the authentication information of the second terminal is set to the second identifier information plus 1, and may also be set to the power of the second identifier information. The preset relationship between the authentication information and the identifier information of the terminals may be any other mapping relationship known by those skilled in the art, and is not further described herein.

The identifier information of the second terminal may be an international mobile subscriber identity (IMSI) of the terminal, or be only a serial number (SNR) of the terminal, or be other identifiers of the terminal. In addition, the identifier information of the second terminal is encapsulated by using a function agreed between the second terminal and the server or other existing functions, which is not specifically limited by the present invention.

The second authentication code is generated by the SIP server at random, and is encapsulated together with the identifier information of the second terminal by using a first algorithm agreed between the second terminal and the server, for example, an MD5 algorithm or other existing algorithms, which is not specifically limited by the present invention.

210. The second terminal parses the received second authentication request message to obtain the authentication information of the second terminal and authenticates the SIP server.

After receiving a second authentication request message sent by the SIP server, the second terminal obtains the authentication information of the second terminal from the second authentication request message, matches the obtained authentication information of the second terminal with the identifier information of the second terminal, and confirms that the authentication information of the second terminal in the second authentication request message matches the identifier information of the second terminal; if the matching succeeds, the second terminal sends an authentication success response message that carries the identifier information of the second terminal to the SIP server; if the matching fails, the second terminal refuses to establish a data transmission channel with the first terminal.

211. The SIP server receives the authentication success response message sent by the second terminal.

212. The SIP server judges whether the authentication success response message sent by the second terminal carries the identifier information of the second terminal.

If the authentication success response message sent by the second terminal carries the identifier information of the second terminal, step 213 is performed; otherwise, step 218 is performed.

213. The SIP server obtains the identifier information of the second terminal from the authentication success response message sent by the second terminal, and determines whether the identifier information of the second terminal matches the pre-stored authentication information of the second terminal.

If yes, step 214 is performed; if no, step 218 is performed.

214. The SIP server sends a second authentication field to the second terminal, where the second authentication field is calculated by using the second authentication code and a second random number generated by the SIP server and by using a preset second algorithm, so that the second terminal obtains a second random number in the second authentication field by using the stored second authentication code and the preset second algorithm and carries the obtained second random number in an authentication request message sent to the SIP server.

To further determine legality of the second terminal, the SIP server initiates an authentication process to the second terminal, and sends a second authentication field to the second terminal. The SIP server stores the identity information of the second terminal, for example, the number of the second terminal, the authentication code of the second terminal, and the identity information of the first terminal, for example, the number of the first terminal.

The second authentication field is calculated by using the second authentication code and the second random number generated by the SIP server and by using an MD5 algorithm or other existing algorithms negotiated between the SIP server and the second terminal. For example, a nonce value may be calculated by using the MD5 algorithm according to the second authentication code and the second random number generated by the SIP server. Other algorithms for calculating the nonce value, which are known by those skilled in the art, are also applicable to this embodiment of the present invention, and are not further described herein.

In this embodiment, the SIP server carries the second authentication field in the authentication request message, with a header field proxy-Authenticate carrying a nonce value, where the nonce value is calculated by using the MD5 algorithm and the random number generated by the server and is generated by encrypting M1.

The second authentication code is sent by the SIP server to the second terminal during the authentication. Therefore, only the second terminal and the SIP server is capable of learning the second authentication code, an illegal terminal cannot obtain the second authentication code, and therefore the illegal terminal can neither pass the authentication nor forge an illegal data channel. Even if the illegal client obtains the second authentication code, a risk of simulating to establish an illegal data channel by an illegal user can be further reduced because an authentication code in each authentication process is generated at random and is different from a previously used authentication code.

215. The SIP server receives an authentication request message sent by the second terminal, where the authentication request message carries the second random number obtained by the second terminal from the second authentication field.

After receiving the second authentication field from the SIP server, the second terminal obtains a second random number, which is a response value, in the second authentication field by using the stored second authentication code and the preset second algorithm, and carries the obtained second random number in an authentication request message sent to the SIP server.

The second terminal re-initiates a session Invite request and an additional Proxy-Authorization authentication request message, and carries a response value in the response message, where the response value serves as a basis for the SIP server to judge legality of the second terminal. For details about other manners and methods for calculating the response value, reference may be made to other algorithms known by those skilled in the art, which is not further described herein.

216. The SIP server determines whether the second random number obtained by the second terminal from the second authentication field and carried in the authentication request message is the same as the second random number generated by the SIP server.

If yes, step 217 is performed; if no, step 218 is performed.

217. The SIP server establishes a data transmission channel between the first terminal and the second terminal.

If the second random number obtained by the second terminal from the second authentication field and carried in the authentication request message is the same as the second random number generated by the SIP server, it may indicate that the second terminal is a legal terminal, and the SIP server establishes a data transmission channel between the first terminal and the second terminal for the first terminal and the second terminal to perform data transmission.

218. The SIP server refuses to establish a data transmission channel between the first terminal and the second terminal.

If the identifier information of the first terminal does not match the pre-stored authentication information of the first terminal, or the authentication success response message includes the identifier information of the second terminal of the second terminal but the identifier information of the second terminal does not match the pre-stored authentication information of the second terminal, or the first random number obtained by the first terminal from the first authentication field and carried in the authentication request message is different from the first random number generated by the SIP server, or the second random number obtained by the second terminal from the second authentication field and carried in the authentication request message is different from the second random number generated by the SIP server, at least one of the first terminal and the second terminal is an illegal terminal, and the SIP server cannot serves the first terminal and the second terminal and therefore refuses to establish a data transmission channel between the first terminal and the second terminal.

In this embodiment, the first algorithm and the second algorithm may be the same algorithm.

According to the method for establishing a data transmission channel provided in this embodiment of the present invention, a SIP server receives a first authentication request message sent by a first terminal, where the first authentication request message includes identifier information of the first terminal; the SIP server verifies legality of the first terminal, that is, the SIP server determines that pre-stored authentication information of the first terminal matches the identifier information of the first terminal; if the authentication information of the first terminal matches the identifier information of the first terminal, the SIP server can confirm that the first terminal is a legal user, and further perform authentication on the first terminal after confirming that the first terminal is a legal user.

After the first terminal passes the authentication, the SIP server obtains stored authentication information of a second terminal according to identity information of the second terminal. After receiving an authentication success response message returned by the second terminal, the SIP server authenticates the second terminal by using the authentication information of the second terminal; after confirming that the second terminal is a legal user, the SIP server further performs authentication on the second terminal. After the authentication on the second terminal succeeds, the SIP server establishes a data transmission channel between the first terminal and the second terminal.

In the processes of authenticating the first terminal and the second terminal, the first authentication field and the second authentication field used for authentication are calculated respectively by using the first authentication code or the second authentication code, and the random number generated by the SIP server and by using a certain algorithm. Because the SIP server generates a different random number in each authentication process, an illegal terminal cannot obtain this random number in advance, thereby effectively avoiding a risk of obtaining data used for authentication by an illegal user.

Because the SIP server pre-stores authentication information used to authenticate terminals, the SIP server verifies legality of the terminals that perform data transmission before the SIP server establishes a data transmission channel between the terminals; the SIP server establishes a data transmission channel between a communication requesting end and a communication peer end only when determining that the communication requesting end is a legal terminal, thereby reducing a risk of establishing a data transmission channel through illegal negotiation between an illegal terminal and the SIP server.

In some cases, for information security, only RTP streams can be connected between the first terminal and the second terminal, while other network data information is isolated. In this case, a session border controller (SBC) needs to be arranged between the SIP server and the first terminal or the second terminal.

Figure 3:
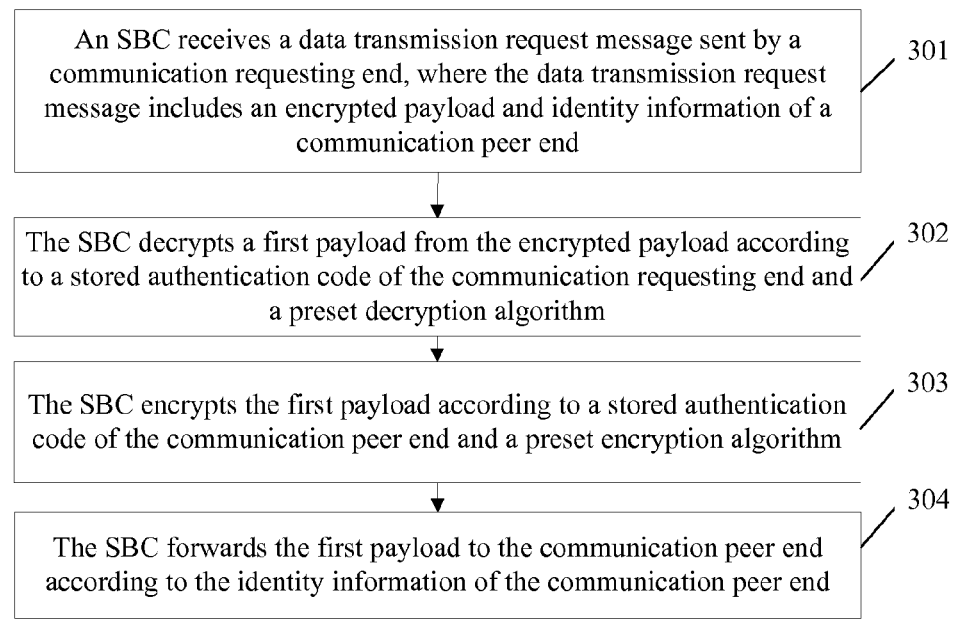
FIG. 3 is a flowchart of still another method for establishing a data transmission channel according to an embodiment of the present invention.

To enhance the security of data transmitted between terminals, an embodiment of the present invention provides a method for data transmission. As shown in FIG. 3, the method includes the following steps:

301. An SBC receives a data transmission request message sent by a communication requesting terminal, where the data transmission request message includes an encrypted payload and identity information of a communication peer end.

In a network system including the SBC, the terminal may perform data transmission by using the SBC.

To further enhance the security of data transmitted by the terminal, the terminal sends a data transmission request message that carries a payload to the SBC, and the terminal may encrypt the payload and carry the encrypted payload in the data transmission request, where the encrypted payload serves as a basis for the SBC to judge validity of the data transmitted by the communication requesting terminal.

With respect to the encrypted payload, the encrypted payload is calculated by the terminal by using an encryption algorithm according to a first payload that needs to be transmitted and a first authentication code negotiated between the terminal and an SIP server in a previous authentication process.

In this embodiment, if a first terminal is the communication requesting terminal, encapsulation is performed by using an existing function negotiated with the SIP server; the encrypted payload carried by the first terminal may be Ls (1, M1), where Ls refers to the encrypted payload, 1 refers to the first payload that the first terminal expects to transmit to the communication peer end, and M1 refers to the first authentication code negotiated between the terminal and the SIP server during authentication and negotiation.

With respect to the encryption algorithm, to confirm legality of the terminal between the terminal and the SBC, a preset encryption algorithm is pre-stored on the terminal and a decryption algorithm of the encryption algorithm is pre-stored on the SBC.

302. The SBC decrypts the first payload from the encrypted payload according to a stored authentication code of the communication requesting end and the preset decryption algorithm.

After receiving the data transmission request sent by the communication requesting terminal, the SBC parses the data transmission request message by using the pre-stored decryption algorithm to obtain the first payload.

With respect to the authentication code of the communication requesting end, it may be generated by the SIP server at random during the authentication in the phase of data channel establishment or be generated by the communication requesting end at random when the communication requesting end initiates a data channel establishment process.

303. The SBC encrypts the first payload according to a stored authentication code of the communication peer end and the preset encryption algorithm.

To further enhance validity of data transmission, the SBC encrypts the first payload according to the stored authentication code of the communication peer end and the preset encryption algorithm. A second terminal is capable of decrypting the first payload correctly only when the second terminal receiving the encrypted first payload is a legal user; if the second terminal is an illegal user, the second terminal cannot decrypt the first payload correctly, thereby further enhancing the security of data transmission.

304. The SBC forwards the first payload to the communication peer end according to the identity information of the communication peer end.

When the data transmission of terminals is performed by using the foregoing solution, if an illegal terminal forges a data transmission message for transmission, after the data transmission message reaches the SBC, the SBC cannot decrypt the data transmission message successfully and therefore discards the data transmission message, thereby preventing the illegal terminal from embezzling a data transmission channel established by legal terminals.

Even if a part of the illegal data transmission message can be decrypted by the SBC successfully, the communication peer end of the illegal terminal cannot recover data sent by the illegal communication requesting terminal because the data on which decryption is performed is already destroyed. Therefore, the security of data transmission can be guaranteed by encrypting decrypting the payload during the data transmission, and a risk of embezzling a data channel between terminals is reduced.

For a system for data transmission including an SBC, the SBC decrypts, according to a preset decryption algorithm, an encrypted payload to obtain a first payload, and forwards the decrypted first payload to a communication peer end; only a payload from a legal communication requesting end can be correctly forwarded to the communication peer end; for a data transmission request of an illegal communication requesting end, because the communication requesting end cannot know a preset encryption algorithm in advance, the illegal communication requesting end cannot encrypt the payload correctly; after the payload of the illegal communication requesting end is decrypted by the SBC, the decrypted payload is definitely not the payload that the communication requesting end wants to transmit to the communication peer end, but is usually some garbled characters. Therefore, a risk of simulating a data channel to perform illegal data transmission by an illegal communication requesting end can be effectively reduced.

To enhance the security of transmitted data during data transmission, an embodiment of the present invention provides another method for data transmission, including the following steps.

401. An SBC receives a data transmission request message that carries a payload and is sent by a communication requesting terminal, where the data transmission request message includes a first payload and identity information of a communication peer end.

To further enhance the security of data transmission performed by the terminal, the terminal sends a data transmission request message that carries a first payload to the SBC, and the terminal may carry a first check field and identifier information of the communication requesting terminal in the data transmission request message. The first check field may serve as a basis for the SBC to judge validity of the data transmitted by the communication requesting terminal.

402. The SBC judges whether the data transmission request message includes the first check field, where the first check field is calculated by the communication requesting end according to the first payload and a check code of the communication requesting end and by using a preset check algorithm.

After receiving the data transmission request sent by the communication requesting terminal, the SBC parses the data transmission request message to obtain the first payload and the identifier information of the communication requesting terminal. If the data transmission request message further includes the first check field, step 403 is performed; otherwise, step 406 is performed.

With respect to an authentication code of the communication requesting end, it may be generated by the SIP server at random during the authentication in the phase of data channel establishment or be generated by the communication requesting end at random when the communication requesting end initiates a data channel establishment process.

403. The SBC calculates a check field by using the preset check algorithm according to the first payload and the authentication code of the communication requesting terminal.

404. The SBC determines that the first check field is calculated by using the first payload and the authentication code of the communication requesting end and by using the preset check algorithm.

The SBC compares the first check field with the calculated check field, and judges whether the first check field is the same as the calculated check field.

If the first check field is the same as the calculated check field, step 405 is performed; if the first check field is different from the calculated check field, step 406 is performed.

405. The SBC forwards the first payload to the communication peer end according to the identity information of the communication peer end.

406. The SBC refuses to transmit the first payload for the communication requesting terminal.

When data transmission of terminals is performed by using a solution of adding a check field to a data transmission message, if an illegal terminal forges a data transmission message for transmission, after the data transmission message reaches the SBC, the SBC cannot authenticate the check field successfully and therefore refuses to transmit data for the illegal terminal and discards the data transmission message, thereby preventing the illegal terminal from embezzling a data transmission channel established by legal terminals.

Even if a part of the illegal data transmission message can be authenticated by the SBC successfully, a communication peer end of the illegal terminal cannot recover data sent by the illegal communication requesting terminal because the data sent by the communication requesting terminal is already destroyed by parsing the check field. Therefore, during the data transmission, carrying a check field in the data transmission message can guarantee the security of data transmission and reduce a risk of embezzling a data channel between terminals.

Before forwarding the first payload of the communication requesting end to the communication peer end, the SBC needs to judge whether the data transmission request of the communication requesting end includes a first check field used to authenticate the communication requesting end. The SBC forwards the first payload of the communication requesting end to the communication peer end only when the data transmission request of the communication requesting end includes the first check field and the first check field is correct. Therefore, a risk of simulating a data channel to perform illegal data transmission by an illegal communication requesting end can be effectively reduced.

Figures 4, 5:
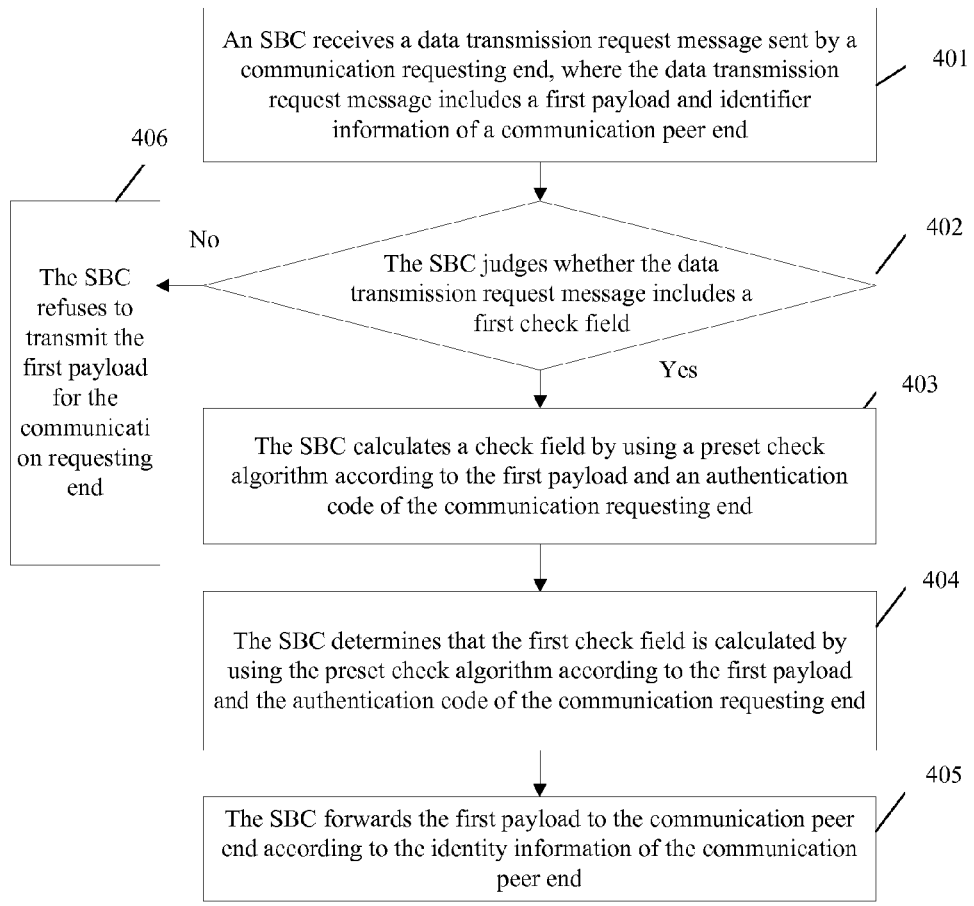
FIG. 4 is a flowchart of still another method for establishing a data transmission channel according to an embodiment of the present invention.
FIG. 5 is a structural diagram of a SIP server according to an embodiment of the present invention.

An embodiment of the present invention provides a SIP server, as shown in FIG. 5, including a first receiving unit 51, a first determining unit 52, a first sending unit 53, and an establishing unit 54.

The first receiving unit 51 is configured to receive a first authentication request message sent by a first terminal. The first authentication request message includes identifier information of the first terminal and identity information of a second terminal. The first determining unit 52 is configured to determine that the identifier information of the first terminal matches pre-stored authentication information of the first terminal. The first sending unit 53 is configured to obtain stored authentication information of the second terminal according to the identity information of the second terminal, and send, according to the identity information of the second terminal, a second authentication request message that carries the authentication information of the second terminal to the second terminal, so that the second terminal confirms that the authentication information of the second terminal in the second authentication request message matches the identifier information of the second terminal and returns an authentication success response message. The establishing unit 54 is configured to establish a data transmission channel between the first terminal and the second terminal after the authentication success response message returned by the second terminal is received.

According to the SIP server provided in this embodiment, the SIP server receives a first authentication request message sent by a first terminal, where the first authentication request message includes identifier information of the first terminal; the SIP server verifies legality of the first terminal, that is, the SIP server determines that pre-stored authentication information of the first terminal matches the identifier information of the first terminal; if the authentication information of the first terminal matches the identifier information of the first terminal, the SIP server can confirm that the first terminal is a legal user and obtain stored authentication information of a second terminal according to identity information of the second terminal; the SIP server sends, according to the identity information of the second terminal, a second authentication request message that carries the authentication information of the second terminal to the second terminal; after receiving an authentication success response message returned by the second terminal, the SIP server establishes a data transmission channel between the first terminal and the second terminal.

Because the SIP server pre-stores authentication information used to authenticate terminals, the SIP server verifies legality of the terminals that perform data transmission before the SIP server establishes a data transmission channel between the terminals; the SIP server establishes a data transmission channel between a communication requesting terminal and a communication peer end only when determining that the communication requesting terminal is a legal terminal, thereby reducing a risk of establishing a data transmission channel through illegal negotiation between an illegal terminal and the SIP server.

Figure 6:
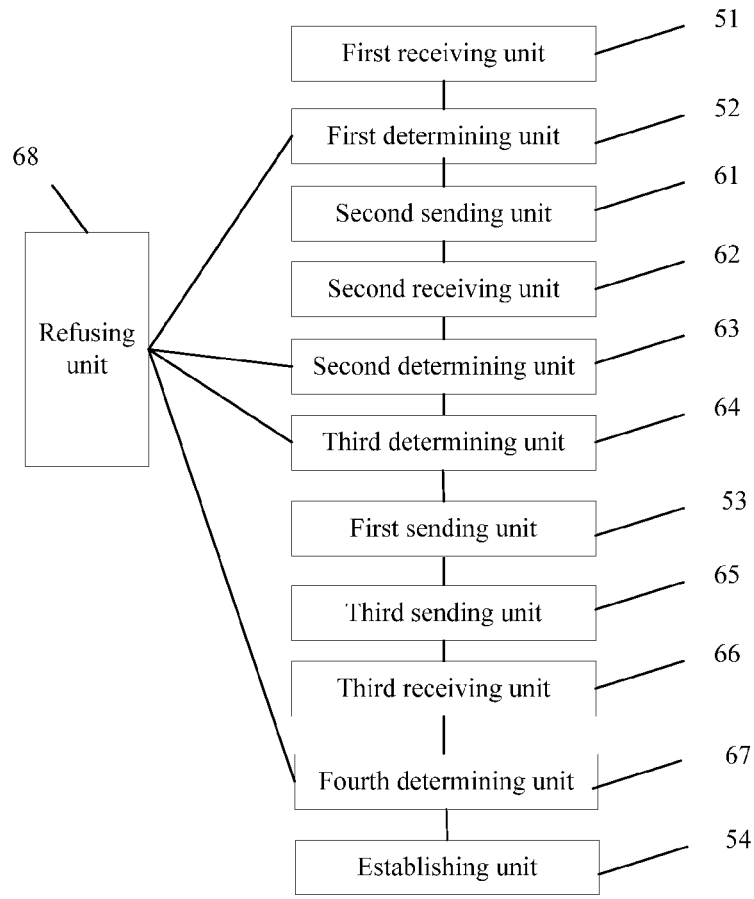
FIG. 6 is a structural diagram of another SIP server according to an embodiment of the present invention.

As an improvement of this embodiment, an embodiment of the present invention provides another SIP server, as shown in FIG. 6, including a first receiving unit 51, a first determining unit 52, a second sending unit 61, a second receiving unit 62, a second determining unit 63, a third determining unit 64, a first sending unit 53, a third sending unit 65, a third receiving unit 66, a fourth determining unit 67, an establishing unit 54, and a refusing unit 68.

The first receiving unit 51 is configured to receive a first authentication request message sent by a first terminal, where the first authentication request message includes identifier information of the first terminal and identity information of a second terminal.

Before performing data communication with the second terminal, the first terminal needs to send a first authentication request message to the SIP server, requesting the SIP server to verify legality of the first terminal. To provide the SIP server with an authentication basis, the first authentication request message includes the identifier information of the first terminal. To enable the SIP server to determine a communication peer end, the identity information of the second terminal serving as the communication peer end is also carried.

With respect to the identifier information of the first terminal, it is used to identify the first terminal. To identify terminals, unique identifier information is set for each terminal, where the identifier information may be set when the terminals are delivered from a factory. Because the identifier information is not a plain text, a risk of embezzlement by an illegal terminal can be reduced.

To further verify legality of terminals, authentication needs to be further performed on the terminals. A first authentication code M generated at random is used in the process of authenticating the terminals, where the authentication code is generated at random by a terminal initiating a request when the terminal initiates establishment of a data transmission channel to the SIP server or is generated by the SIP server when the SIP server initiates authentication to the communication peer end.

The first determining unit 52 is configured to determine that the identifier information of the first terminal matches pre-stored authentication information of the first terminal.

The second sending unit 61 is configured to send a first authentication field to the first terminal, where the first authentication field is calculated by using the first authentication code and a first random number generated by the SIP server and by using a preset first algorithm, so that the first terminal obtains a first random number in the first authentication field by using a stored first authentication code and the preset first algorithm and carries the obtained first random number in an authentication request message sent to the SIP server.

The SIP server pre-stores authentication information of identifier information of all terminals served by the SIP server, where the authentication information and the identifier information of the terminals meet a preset mapping relationship.

The SIP server obtains the authentication information of the first terminal. The SIP server judges whether the identifier information of the first terminal matches the authentication information of the first terminal.

To further confirm legality of the first terminal, the SIP server initiates an authentication process to the first terminal, and the SIP server sends the first authentication field to the first terminal.

The second receiving unit 62 is configured to receive the authentication request message sent by the first terminal, where the authentication request message carries the first random number obtained by the first terminal from the first authentication field.

Further, alternatively, the first authentication information is obtained by encapsulating the first authentication field and the identity information of the first terminal by using a function agreed between the first terminal and the SIP server.

The second determining unit 63 is configured to determine that the authentication success response message includes the identifier information of the second terminal and that the identifier information of the second terminal matches pre-stored authentication information of the second terminal.

The third determining unit 64 is configured to determine that the first random number obtained by the first terminal from the first authentication field and carried in the authentication request message is the same as the first random number generated by the SIP server.

The first sending unit 53 is configured to send a second authentication request message to the second terminal according to the identity information of the second terminal.

Further, alternatively, the second authentication request message includes a second authentication code generated at random and authentication information of the second terminal preset for the second terminal.

If the identifier information of the first terminal matches the pre-stored authentication information of the first terminal, it indicates that the first terminal is legal, and the first terminal can perform data communication through the SIP server. Then, the SIP server confirms an address of the second terminal according to the identity information, and sends a second authentication request message to the second terminal according to the address, and the second terminal is the communication peer end of a data transmission channel that the first terminal requests to establish.

With respect to the second authentication request message, the second authentication request message may include pre-stored authentication information of the second terminal, and the authentication information of the second terminal matches the identifier information of the second terminal of the second terminal.

The third sending unit 65 is configured to send a second authentication field to the second terminal, where the second authentication field is calculated by using the second authentication code and a second random number generated by the SIP server and by using a preset second algorithm, so that the second terminal obtains a second random number in the second authentication field by using the stored second authentication code and the preset second algorithm and carries the obtained second random number in an authentication request message sent to the SIP server.

After receiving an authentication success response message that carries second authentication information and is sent by the second terminal, the SIP server needs to judge whether the second random number carried in the authentication success response message is correct and further judges whether the second terminal is a legal terminal.

The third receiving unit 66 is configured to receive the authentication request message sent by the second terminal, where the authentication request message carries the second random number obtained by the second terminal from the second authentication field.

Further, alternatively, the second authentication information is calculated by using the second authentication field and the identifier information of the second terminal and by using the second algorithm.

The fourth determining unit 67 is configured to determine that the second random number obtained by the second terminal from the second authentication field and carried in the authentication request message is the same as the second random number generated by the SIP server.

The establishing unit 54 is configured to establish a data transmission channel between the first terminal and the second terminal after the authentication success response message returned by the second terminal is received.

For terminals served by the SIP server, a first algorithm is pre-agreed between the SIP server and the terminals served by the SIP server. Therefore, the SIP server can judge whether the second authentication information is calculated by using the second authentication field and by using the first algorithm.

Further, alternatively, the establishing unit is configured to establish a data transmission channel between the first terminal and the second terminal if the authentication success response message includes the identifier information of the second terminal and the identifier information of the second terminal matches the pre-stored authentication information of the second terminal.

The refusing unit 68 is configured to refuse to establish a data transmission channel between the first terminal and the second terminal if the identifier information of the first terminal does not match the pre-stored authentication information of the first terminal, or the authentication success response message includes the identifier information of the second terminal of the second terminal but the identifier information of the second terminal does not match the pre-stored authentication information of the second terminal, or the first random number obtained by the first terminal from the first authentication field and carried in the authentication request message is different from the first random number generated by the SIP server, or the second random number obtained by the second terminal from the second authentication field and carried in the authentication request message is different from the second random number generated by the SIP server.

According to the SIP server provided in this embodiment, the SIP server receives a first authentication request message sent by a first terminal, where the first authentication request message includes identifier information of the first terminal of the first terminal; the SIP server verifies legality of the first terminal, that is, the SIP server determines that pre-stored authentication information of the first terminal matches the identifier information of the first terminal; if the authentication information of the first terminal matches the identifier information of the first terminal, the SIP server can confirm that the first terminal is a legal user and obtain stored authentication information of a second terminal according to identity information of the second terminal; the SIP server sends, according to the identity information of the second terminal, a second authentication request message that carries the authentication information of the second terminal to the second terminal; after receiving an authentication success response message returned by the second terminal, the SIP server establishes a data transmission channel between the first terminal and the second terminal.

In addition, the SIP server illustrated in FIG. 5 and FIG. 6 can perform the specific steps of the method provided in the embodiments illustrated in FIG. 1, FIG. 2A, FIG. 2B, and FIG. 2C, which is not further described herein. In addition, the SIP server may be such entity devices as a computer, and related functions performed by each unit may be performed by a processor of the computer.

Because the SIP server pre-stores authentication information used to authenticate terminals, the SIP server verifies legality of the terminals that perform data transmission before the SIP server establishes a data transmission channel between the terminals; the SIP server establishes a data transmission channel between a communication requesting terminal and a communication peer end only when determining that the communication requesting terminal is a legal terminal, thereby reducing a risk of establishing a data transmission channel through illegal negotiation between an illegal terminal and the SIP server.

Figure 7:
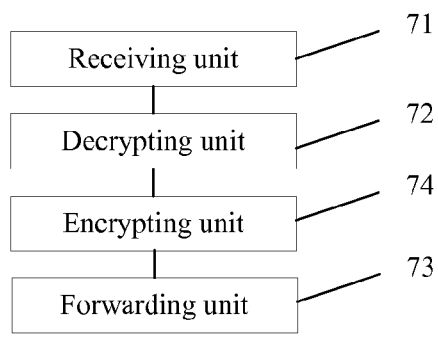
FIG. 7 is a structural diagram of a session border controller according to an embodiment of the present invention.

An embodiment of the present invention provides a session border controller, as shown in FIG. 7, including a receiving unit 71, a decrypting unit 72, and a forwarding unit 73.

The receiving unit 71 is configured to receive a data transmission request message that carries a payload and is sent by a communication requesting terminal, where the data transmission request message includes an encrypted payload and identity information of a communication peer end. The decrypting unit 72 is configured to decrypt a first payload from the encrypted payload according to a stored authentication code of the communication requesting end and a preset decryption algorithm. The forwarding unit 73 is configured to forward the first payload to the communication peer end according to the identity information of the communication peer end.

Further, alternatively, the session border controller provided in this embodiment of the present invention may further include an encrypting unit 74 configured to encrypt the first payload according to a stored authentication code of the communication peer end and a preset encryption algorithm.

According to the session border controller provided in this embodiment, when data transmission of terminals is performed by using the foregoing solution, if an illegal terminal forges a data transmission message for transmission, after the data transmission message reaches the SBC, the SBC cannot decrypt the data transmission message successfully and therefore discards the data transmission message, thereby preventing the illegal terminal from embezzling a data transmission channel established by legal terminals. In addition, the session border controller illustrated in FIG. 7 can perform the specific steps of the method provided in the embodiment illustrated in FIG. 3, which is not further described herein. In addition, the session border controller may be such entity devices as a computer, and related functions performed by each unit may be performed by a processor of the computer.

Even if a part of the illegal data transmission message can be decrypted by the SBC successfully, the communication peer end of the illegal terminal cannot recover data sent by the illegal communication requesting terminal because the data on which decryption is performed is already destroyed. Therefore, the security of data transmission can be guaranteed by encrypting and decrypting the payload during the data transmission, and a risk of embezzling a data channel between terminals is reduced.

Figure 8:
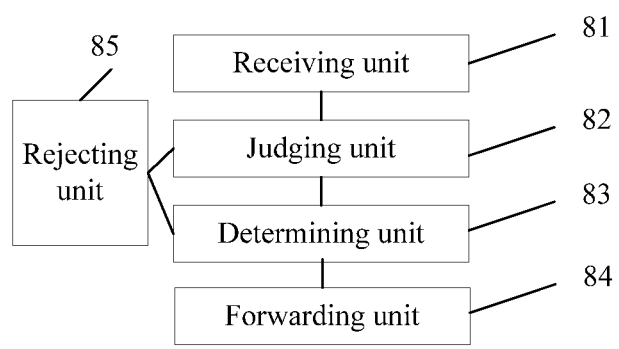
FIG. 8 is a structural diagram of another session border controller according to an embodiment of the present invention.

An embodiment of the present invention provides another session border controller, as shown in FIG. 8, including a receiving unit 81, a judging unit 82, a determining unit 83, a forwarding unit 84, and a rejecting unit 85.

The receiving unit 81 is configured to receive a data transmission request message that carries a payload and is sent by a communication requesting terminal, where the data transmission request message includes a first payload and identifier information of a communication peer end.

The judging unit 82 is configured to judge whether the data transmission request message includes a first check field, where the first check field is calculated by the communication requesting end by using the first payload and a check code of the communication requesting end and by using a preset check algorithm.

The determining unit 83 is configured to determine, if the data transmission request message includes the first check field, that the first check field is calculated by using the first payload and the check code of the communication requesting end and by using the preset check algorithm.

The forwarding unit 84 is configured to forward the first payload to the communication peer end.

The rejecting unit 85 is configured to reject the data transmission request of the communication requesting end if the data transmission request message does not include the first check field, or reject the data transmission request of the communication requesting end if the first check field is not calculated by using the first payload and the check code of the communication requesting end and by using the preset check algorithm.

According to the session border controller provided in this embodiment, when data transmission of terminals is performed by using a solution of adding a check field to a data transmission message, if an illegal terminal forges a data transmission message for transmission, after the data transmission message reaches the SBC, the SBC cannot authenticate the check field successfully and therefore refuses to transmit data for the illegal terminal and discards the data transmission message, thereby preventing the illegal terminal from embezzling a data transmission channel established by legal terminals.

In addition, the session border controller illustrated in FIG. 8 can perform the specific steps of the method provided in the embodiment illustrated in FIG. 4, which is not further described herein. In addition, the session border controller may be such entity devices as a computer, and related functions performed by each unit may be performed by a processor of the computer.

Even if a part of the illegal data transmission message can be authenticated by the SBC successfully, a communication peer end of the illegal terminal cannot recover data sent by the illegal communication requesting terminal because the data sent by the communication requesting terminal is already destroyed by parsing the check field. Therefore, during the data transmission, carrying a check field in the data transmission message can guarantee the security of data transmission and reduce a risk of embezzling a data channel between terminals.

Figure 9:
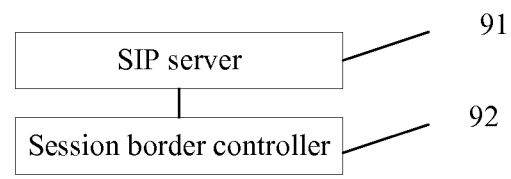
FIG. 9 is a structural diagram of a system for data transmission according to an embodiment of the present invention.

An embodiment of the present invention provides a system for data transmission, as shown in FIG. 9, including a SIP server 91 and a session border controller 92.

The SIP server 91 may be the SIP server provided in FIG. 5 or FIG. 6. For details about specific functions of each unit of the SIP server 91, reference may be made to the descriptions of the foregoing embodiments.

The session border controller 92 may be the session border controller provided in FIG. 7 or FIG. 8. For details about specific functions of each unit of the session border controller 92, reference may be made to the descriptions of the foregoing embodiments.

According to the system for data transmission provided in this embodiment, a SIP server receives a first authentication request message sent by a first terminal, where the first authentication request message includes identifier information of the first terminal of the first terminal. The SIP server verifies legality of the first terminal, that is, the SIP server determines that pre-stored authentication information of the first terminal matches the identifier information of the first terminal; if the authentication information of the first terminal matches the identifier information of the first terminal, the SIP server can confirm that the first terminal is a legal user, and establish a data transmission channel between the first terminal and a second terminal.

Because the SIP server pre-stores authentication information used to authenticate terminals, the SIP server verifies legality of the terminals that perform data transmission before the SIP server establishes a data transmission channel between the terminals; the SIP server establishes a data transmission channel between a communication requesting terminal and a communication peer end only when determining that the communication requesting terminal is a legal terminal, thereby reducing a risk of establishing a data transmission channel through illegal negotiation between an illegal terminal and the SIP server.

Through the foregoing description of the embodiments, it may be clearly understood by those skilled in the art that the present invention may be implemented by software plus necessary universal hardware, and definitely may also be implemented by hardware, but in many cases, the software implementation is preferred. Based on such an understanding, the technical solutions of the present invention essentially, or the part contributing to the prior art may be implemented in the form of a software product. The computer software product is stored in a readable storage medium, for example, a floppy disk, a hard disk, or an optical disk of the computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by those skilled in the art within the technical scope disclosed in the present invention shall fall within the protection scope of the present invention. Therefore, the protection scope of the present invention shall be subject to the protection scope of the claims.

What is claimed is:

1. A method for establishing a data transmission channel, the method comprising:
   receiving a first authentication request message sent by a first terminal, wherein the first authentication request message comprises a terminal identifier of the first terminal and routing information of a second terminal;
   determining that the terminal identifier of the first terminal matches pre-stored authentication information of the first terminal;
   obtaining stored authentication information of the second terminal according to the routing information of the second terminal;
   sending, according to the routing information of the second terminal, a second authentication request message that carries the authentication information of the second terminal to the second terminal;
   receiving an authentication success response message from the second terminal that confirms that the authentication information of the second terminal in the second authentication request message matches a terminal identifier of the second terminal, wherein the authentication information of the second terminal and the terminal identifier of the second terminal meet a preset mapping relationship; and
   after receiving the authentication success response message, establishing a data transmission channel between the first terminal and the second terminal;
   wherein the first authentication request message further comprises a first authentication code generated by the first terminal at random and wherein, before the sending the second authentication request message to the second terminal, the method further comprises:
      sending a first authentication field to the first terminal, wherein the first authentication field is calculated by using the first authentication code and a first random number that is self-generated and by using a preset first algorithm;
      receiving an authentication request message sent by the first terminal, wherein the authentication request message carries the first random number obtained by the first terminal from the first authentication field by using a stored first authentication code and the preset first algorithm; and
      determining that the first random number obtained by the first terminal from the first authentication field and carried in the authentication request message is the same as the first random number that is self-generated.

2. The method according to claim 1, wherein before establishing the data transmission channel between the first terminal and the second terminal, the method further comprises determining that the authentication success response message comprises the terminal identifier of the second terminal and that the terminal identifier of the second terminal matches pre-stored authentication information of the second terminal.

3. The method according to claim 1, wherein the second authentication request message comprises a second authentication code that is self-generated at random and wherein, before the establishing the data transmission channel between the first terminal and the second terminal, the method further comprises:
   sending a second authentication field to the second terminal, wherein the second authentication field is calculated by using the second authentication code and a second random number that is self-generated and by using a preset second algorithm;
   receiving an authentication request message sent by the second terminal, wherein the authentication request message carries the second random number obtained by the second terminal from the second authentication field by using the stored second authentication code and the preset second algorithm; and
   determining that the second random number obtained by the second terminal from the second authentication field and carried in the authentication request message is the same as the second random number that is self-generated.

4. The method according to claim 3, further comprising:
refusing to establish a data transmission channel between the first terminal and the second terminal if the terminal identifier of the first terminal does not match the pre-stored authentication information of the first terminal, or the authentication success response message comprises the terminal identifier of the second terminal of the second terminal but the terminal identifier of the second terminal does not match the pre-stored authentication information of the second terminal, or the first random number obtained by the first terminal from the first authentication field and carried in the authentication request message is different from the first random number that is self-generated, or the second random number obtained by the second terminal from the second authentication field and carried in the authentication request message is different from the second random number that is self-generated.

5. The method according to claim 1, wherein determining that the terminal identifier of the first terminal matches pre-stored authentication information of the first terminal comprises determining that the terminal identifier of the first terminal is the same as the pre-stored authentication information of the first terminal.

6. The method according to claim 1, wherein, after establishing the data transmission channel between the first terminal and the second terminal, the method further comprises:
receiving a data transmission request message sent by a communication requesting end which is one terminal of the first terminal and the second terminal, wherein the data transmission request message comprises an encrypted payload and routing information of a communication peer end which is another terminal of the first terminal and the second terminal;
decrypting a first payload from the encrypted payload according to a stored authentication code of the communication requesting end and a preset decryption algorithm; and
forwarding the first payload to the communication peer end according to the routing information of the communication peer end.

7. The method according to claim 6, wherein, before the forwarding the first payload to the communication peer end according to the routing information of the communication peer end, the method further comprises encrypting the first payload according to a stored authentication code of the communication peer end and a preset encryption algorithm.

8. The method according to claim 1, wherein, after establishing the data transmission channel between the first terminal and the second terminal, further comprising:
receiving a data transmission request message sent by a communication requesting end which is one terminal of the first terminal and the second terminal, wherein the data transmission request message comprises a first payload and routing information of a communication peer end which is another terminal of the first terminal and the second terminal;
determining whether the data transmission request message comprises a first check field;
when the data transmission request message further comprises the first check field, determining that the first check field is calculated by using the first payload and a check code of the communication requesting end and by using a preset check algorithm; and
forwarding the first payload to the communication peer end.

9. The method according to claim 8, further comprising rejecting the data transmission request of the communication requesting end if the data transmission request message does not comprise the first check field or the first check field is not calculated by using the first payload and the check code of the communication requesting end and by using the preset check algorithm.

10. A Session Initiation Protocol (SIP) server, comprising:
a processor; and
a computer-readable non-transitory storage medium storing a program to-be executed by the processor, the program including instructions comprising:
a first receiving unit, configured to receive a first authentication request message sent by a first terminal, wherein the first authentication request message comprises a terminal identifier of the first terminal and routing information of a second terminal, wherein the first authentication request message further comprises a first authentication code generated at random;
a first determining unit, configured to determine that the terminal identifier of the first terminal matches pre-stored authentication information of the first terminal;
a first sending unit, configured to obtain stored authentication information of the second terminal according to the routing information of the second terminal, and send, according to the routing information of the second terminal, a second authentication request message that carries the authentication information of the second terminal to the second terminal, so that the second terminal confirms that the authentication information of the second terminal in the second authentication request message matches a terminal identifier of the second terminal by determining if the authentication information of the second terminal and the terminal identifier of the second terminal meet a preset mapping relationship and returns an authentication success response message;
an establishing unit, configured to establish a data transmission channel between the first terminal and the second terminal after the authentication success response message returned by the second terminal is received;
a second sending unit, configured to send a first authentication field to the first terminal, wherein the first authentication field is calculated by using the first authentication code and a first random number generated by the SIP server and by using a preset first algorithm, so that the first terminal obtains a first random number in the first authentication field by using a stored first authentication code and the preset first algorithm and carries the obtained first random number in an authentication request message sent to the SIP server;
a second receiving unit, configured to receive the authentication request message sent by the first terminal, wherein the authentication request message carries the first random number obtained by the first terminal from the first authentication field; and
a third determining unit, configured to determine that the first random number obtained by the first terminal from the first authentication field and carried in the authentication request message is the same as the first random number generated by the SIP server.

11. The SIP server according to claim 10, further comprising a second determining unit, configured to determine that the authentication success response message comprises the terminal identifier of the second terminal and that the terminal identifier of the second terminal matches pre-stored authentication information of the second terminal.

12. The SIP server according to claim 10, wherein the second authentication request message comprises a second authentication code generated by the SIP server at random, and the SIP server further comprises:
   a third sending unit, configured to send a second authentication field to the second terminal, wherein the second authentication field is calculated by using the second authentication code and a second random number generated by the SIP server and by using a preset second algorithm, so that the second terminal obtains a second random number in the second authentication field by using the stored second authentication code and the preset second algorithm and carries the obtained second random number in an authentication request message sent to the SIP server;
   a third receiving unit, configured to receive the authentication request message sent by the second terminal, wherein the authentication request message carries the second random number obtained by the second terminal from the second authentication field; and
   a fourth determining unit, configured to determine that the second random number obtained by the second terminal from the second authentication field and carried in the authentication request message is the same as the second random number generated by the SIP server.

13. The SIP server according to claim 10, further comprising a refusing unit, configured to refuse to establish a data transmission channel between the first terminal and the second terminal if the terminal identifier of the first terminal does not match the pre-stored authentication information of the first terminal, or the authentication success response message comprises the terminal identifier of the second terminal of the second terminal but the terminal identifier of the second terminal does not match the pre-stored authentication information of the second terminal, or the first random number obtained by the first terminal from the first authentication field and carried in the authentication request message is different from the first random number generated by the SIP server, or the second random number obtained by the second terminal from the second authentication field and carried in the authentication request message is different from the second random number generated by the SIP server.

14. A system for data transmission, comprising:
   a SIP server; and
   a session border controller;
   wherein the SIP server is configured to receive a first authentication request message sent by a first terminal, wherein the first authentication request message comprises a terminal identifier of the first terminal, terminal and routing information of a second terminal, and a first authentication code generated by the first terminal at random, wherein the SIP server is also configured to send a first authentication field to the first terminal, wherein the first authentication field is calculated by using the first authentication code and a first random number that is self-generated and by using a preset first algorithm, receive an authentication request message sent by the first terminal, wherein the authentication request message carries the first random number obtained by the first terminal from the first authentication field by using a stored first authentication code and the preset first algorithm, and determine that the first random number obtained by the first terminal from the first authentication field and carried in the authentication request message is the same as the first random number that is self-generated, wherein the SIP server is also configured to determine that the terminal identifier of the first terminal matches pre-stored authentication information of the first terminal, to obtain stored authentication information of the second terminal according to the routing information of the second terminal, to send, according to the routing information of the second terminal, a second authentication request message that carries the authentication information of the second terminal to the second terminal, so that the second terminal confirms that the authentication information of the second terminal in the second authentication request message matches the terminal identifier of the second terminal by determining if the authentication information of the second terminal and a terminal identifier of the second terminal meet a preset mapping relationship and returns an authentication success response message, and after receiving the authentication success response message returned by the second terminal, to establish a data transmission channel between the first terminal and the second terminal; and wherein the session border controller, is configured to receive a data transmission request message sent by a communication requesting end which is one terminal of the first terminal and the second terminal, wherein the data transmission request message comprises a first payload and routing information of a communication peer end which is another terminal of the first terminal and the second terminal, determine whether the data transmission request message comprises a first check field, if the data transmission request message further comprises the first check field, the session border controller is further configured to determine that the first check field is calculated by using the first payload and a check code of the communication requesting end and by using the preset first algorithm, and forward the first payload to the communication peer end.

* * * * *